March 19, 1940. W. C. MASON 2,193,828
OIL BURNER
Filed Oct. 1, 1936 2 Sheets-Sheet 1
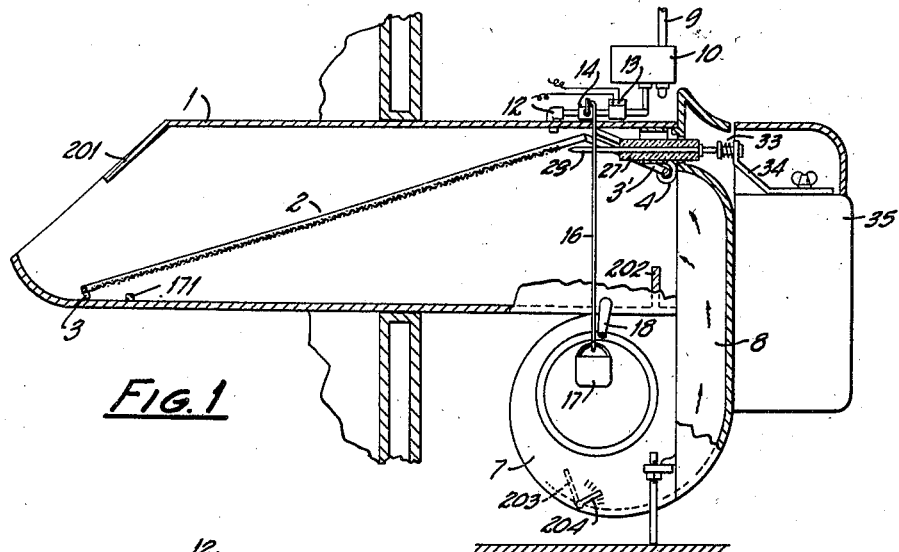
INVENTOR
WILLIAM C. MASON
BY
ATTORNEY March 19, 1940.  W. C. MASON  2,193,828
OIL BURNER
Filed Oct. 1, 1936   2 Sheets-Sheet 2
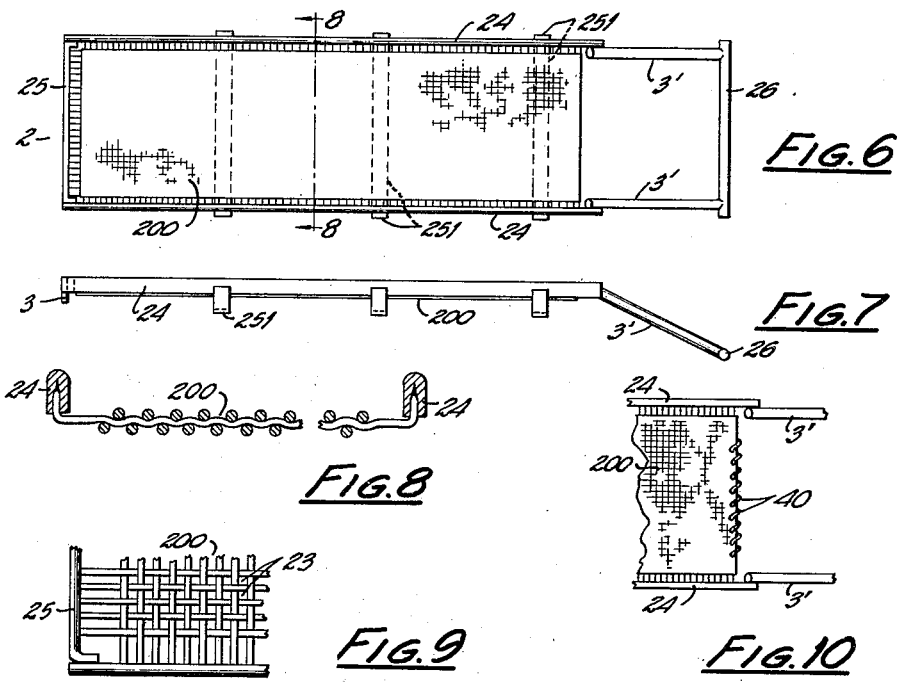
INVENTOR
WILLIAM C. MASON
BY
ATTORNEY Patented Mar. 19, 1940

2,193,828

UNITED STATES PATENT OFFICE 2,193,828

OIL BURNER

William C. Mason, Albany, N. Y.

Application October 1, 1936, Serial No. 103,496

5 Claims. (Cl. 158—91)

My invention particularly relates to an oil burner or liquid fuel burner wherein the liquid fuel is supplied to a stream of air and distributed uniformly thereacross whereby the combustible fuel mixture so produced has substantially uniformly distributed and suspended particles of the liquid fuel therein.

My invention has for a first object the provision of a liquid distributing element which is so constructed and arranged as to carry a flow of liquid fuel thereacross in such a manner that the liquid will be substantially uniformly distributed across the surface thereof; and said element being formed with interstices whereby, when said element is disposed in the path of flow of air, the liquid fuel will be picked up and substantially uniformly distributed in the air stream.

A further object resides in the provision of a fuel distributing manifold which is adapted and designed to supply fuel to the foregoing fuel distributing element at a plurality of points along the surface thereof and at substantially equal discharge capacities.

Another object resides in the provision of a liquid fuel burner wherein the various elements thereof are of simplified design, cheap to manufacture and comparatively easy to assemble.

With these and other objects in view, my invention includes the novel elements and the combinations and arrangements thereof described below and illustrated in the accompanying drawings in which—

Fig. 1 is a longitudinal section through the burner assembly, illustrating the fuel control means and ignition means associated therewith;

Fig. 2 is a fragmentary perspective view of the air duct, illustrating the fuel supply line including the fuel control means and distributing manifold;

Fig. 3 is a fragmentary, transverse section through the air duct and the fuel manifold associated therewith;

Fig. 4 is a fragmentary sectional view illustrating a preferred, relative disposition of the fuel distributing element and the ignition terminals;

Fig. 5 is a fragmentary, transverse section through the air duct taken at right angles to Fig. 4;

Fig. 6 is a plan view of a preferred form of fuel distributing element;

Fig. 7 is an elevation view of Fig. 6;

Fig. 8 is a fragmentary, somewhat enlarged section taken in the plane 8—8 of Fig. 6;

Fig. 9 is an enlarged detail view of a portion of the fuel distributing element;

Fig. 10 is a fragmentary plan view of the distributing element, illustrating a modification.

Referring to the drawings, 1 indicates generally an air conduit which may be formed of any desired cross sectional configuration but which in the embodiment illustrated is rectangular in form. Within the duct 1 is disposed a fuel distributing element indicated generally at 2 and which is provided at one end with spaced studs or legs 3 which are adapted to rest upon the lower surface of the air duct. The other end of the element 2 is provided with supporting arms 3' (see Figs. 6 and 7) which are adapted to engage supporting guides 4, secured in opposed relation on the side walls of the duct 1. The guides 4 are preferably provided with depending hook portions 5 upon which the arms 3' are supported and with obliquely extending portions 6 which serve merely to guide the arms 3' into position on the hook portions 5. With this arrangement, the element 2 may be inserted through one end of the duct, the arms 3' passing beneath the guide 4 and the studs 3 resting upon the lower surface of the duct. By raising and moving the element 2 in a reverse direction, the arms 3' engage the portions 6 of the guides 4 and direct the arms into proper supporting position thereon.

Air is supplied to the duct 1 by means of an air blower, indicated at 7, which communicates through an upwardly extending passage 8 with the duct 1. It will be understood that an electric motor, which is not illustrated, serves to drive the air blower and that the air, upon passing upwardly through the passage 8 and duct 1 will pass through the fuel distributing element 2 which is air pervious, as hereinafter more fully described.

Fuel is supplied to the burner through a fuel supply pipe 9 which supplies liquid fuel to a liquid level valve 10 from which the fuel flows through pipe line 11 to the fuel distributing manifold indicated generally at 12. Between the level valve and the distributing manifold and in the line 11, is disposed a magnetic, shut-off valve 13 and a trip valve 14. The trip valve 14 may be of the usual type which is provided with an actuating lever 15 upon which is suspended, by means of a link 16, a trip bucket 17 into which fuel may flow through the discharge pipe 18, see Fig. 1, when ignition fails to take place or, for some other reason, fuel is not consumed.

The flow of fuel to the trip bucket 17 is controlled by means of a bar 171 disposed transversely of and on the lower surface of duct 1 which bar in effect forms a dam. It will be understood that the duct is mounted with a slight inclination to the rear, or right as viewed in Fig. 1 and this construction permits a small, predetermined amount of fuel to accumulate without flowing to the trip bucket. If, however, the amount of unconsumed fuel exceeds the amount retainable by the dam 17, which amount, it is predetermined, could not be consumed in the normal operation of the burner without the formation of carbon, said excess fuel will flow along the inclined lower surface of duct 1 and be discharged into trip bucket 17 which, when filled with a predetermined weight of fuel, will close valve 14.

The fuel manifold 12 comprises a plurality of and preferably two, depending lugs 19 which are formed in part to rest upon the top of the air duct 1 and extend therethrough to positions predeterminately spaced from the fuel distributing element 2. The lugs 19 are provided with passages 20 which communicate through comparatively small orifices 21 with a common supply passage 22 in the body of the manifold 12. It will be understood that the capacity of the passage 22 is greater than the combined capacities of the orifices 21. With this arrangement, fuel is discharged through both orifices 21 and passages 20 at substantially the same rate of flow whereby the quantity of fuel supplied at predetermined spaced points transversely of the element 2 is substantially the same.

The fuel distributing element, indicated generally at 2 and particularly illustrated in Figs. 6 to 10, inclusive, comprises an air pervious or foraminous element 200 which, in the embodiment illustrated and by way of example, is formed of interwoven strands, for example, of asbestos fibers and stiffening or strengthening elements such as nichrome wires. The woven construction provides an element having interstices or openings 23 and the weave is so designed that the combined areas of the openings are predeterminately proportioned to the total surface areas of the individual strands. In other words, the asbestos strands form a surface over which the liquid fuel may flow and the interstices form air passages through which air supplied under pressure may pass and pick up particles of the liquid fuel. In order, therefore, properly to proportion and distribute the oil particles in an air stream, it is necessary to fashion the fuel distributing element so that the total areas of the openings therein bear a predetermined ratio to the total surface area of the distributing element. Obviously, the element 200 may be fabricated in any desired manner to provide an element of the foregoing character which is air pervious and which permits the flow of a viscous liquid thereacross substantially to distribute the same uniformly and around the openings therein whereby, due to the passage of air therethrough, a combustible mixture is formed having fuel particles uniformly suspended therein. Furthermore, any suitable material may be used which will permit the flow of a viscous liquid and distribute the same around the air spaces formed in the element.

From the foregoing, it should be evident that my distributing element comprises a fuel-absorbent element which is foraminous to permit the passage of air therethrough and which, due to the absorbent character thereof, effects a distribution of the liquid fuel, fed thereto, substantially over the entire element. Furthermore, it should be noted that the opposite faces or surfaces are composed of fuel-absorbent material and that absorbent material extends between said surfaces. Hence, liquid fuel may pass from one surface to the other through the absorbent material with substantially no restriction.

In operation, when liquid fuel is supplied to the fuel-distributing element and assuming it is disposed in the position illustrated in Fig. 1 of the drawings, the fuel flows on the lower surface of the element and is distributed through the absorbent material substantially to all portions of the element. Moreover, due to the fact that the foramina are disposed in close relation, substantially all surface portions of the element are subjected to air passing therethrough. Hence, liquid fuel may be consumed per unit volume of my distributing element at a very high rate and, at the same time, substantially complete combustion thereof is produced.

In the preferred form of my distributing element, a depressed surface portion or, a plurality of depressed surface portions are provided therein which extend generally longitudinally thereof as illustrated in the sectional view taken transversely through the element in Fig. 3. Two depressions are illustrated because two fuel feeders are provided. The depressed surface portions provide means for directing the flow of liquid fuel on the under surface of the element for more uniform fuel distribution thereover when, for example, the element is slightly inclined in a transverse direction. The major portion of the fuel will flow along the lower potions of the element and, because the depressions extend generally in a longitudinal direction, transverse inclination of the element will not effect a flow of fuel diagonally to one side thereof.

These depressions, in the embodiment illustrated, appear as ridges on the lower surface of the screen-like, fuel distributing and supporting element and the greater part of the fuel fed to the top of said element in the zones of said ridges, when said element is inclined at a substantial angle to the horizontal as shown in the drawings, will travel along said ridges and over said element in a gravitational flow and by capillary attraction said fuel will be distributed to all portions of said element. In operation, therefore, fuel will burn over the entire surface of the element and, under ordinary operating conditions, no fuel will flow off the lower end thereof due to the fact that the fuel is distributed over said element and may be consumed at a fairly high rate.

The air pervious element 200 of the embodiment of my invention illustrated herein is preferably supported upon a frame comprising the longitudinally extending side bars 24 and the transversely extending bar 25. The warp or weft threads may be removed, as the case may be, for a short distance and the remaining, projecting threads may be secured in and retained by the bars 24 and 25 in the manner illustrated in Fig. 8. For example, where several of the warp threads are removed adjacent both sides of the element 2, the extending weft threads are inserted in the U-shaped bars 24 and retained between the compressed side members thereof. The bars are then preferably turned at right angles to the surface of the fabric so that any fluid that may tend to flow across the weft threads will not extend up to the bars and run therealong. The bar 25, which is disposed at one end of the fabric is formed in the same manner as the bars 24 and serves to retain the fabric in extended position in the same manner. It will be evident, from an inspection of the foregoing described element 2, that an air space is provided around all sides of the fuel distributing element 200 thereby preventing a portion of the fuel from flowing to the frame and being imperfectly distributed relative to the air stream. Furthermore, the flow of air around element 200 permits a thorough scavenging of the walls of the duct. Obviously, this result may be produced in various ways without deviating from the spirit of the present invention. The arms 3' may be secured to the ends of the bars 24 and preferably at a point spaced from the fabric or air pervious element to prevent the fuel through capillary attraction from flowing thereto. The arms 3' may be bent outwardly at their lower ends or, as illustrated in Fig. 6, suitably secured to a transversely extending bar 26, the ends of which are receivable in the supporting guides 4. Transverse spacing bars 251 may be secured to bars 24 and spaced below the element 200 to form a rigid construction.

The fuel ignition means preferably comprises spaced terminals 29 and 30 (see Figs. 4 and 5) which are supported in insulating sleeves 27 and 28 respectively. The sleeves 27 and 28 are preferably supported in a bracket 31 secured within the duct 1 and disposed to direct the terminals 29 and 30 toward the element 2. The terminals 29 and 30 are formed of slender rods of suitable material, the ends of which are preferably disposed in line with the upper, transversely extending end of the element 200. The terminals are provided with shoulders 32 which limit the inward movement thereof and the ends of the terminals beyond the shoulders 32 are disposed to engage movable contacts 33 which are mounted in supporting arms 34 extending from and in electrical contact with the secondary terminals of a transformer indicated at 35. Each of the two contacts 33 comprises a stem 36 which engages respective openings in the supports 34 and which are preferably beaded over as at 37 to retain the same in the brackets 34. A spring element 38 is interposed between the bracket 34 and the head 39 of the contacts 33 serving normally to urge the same in engagement with the terminals 29 and 30. The foregoing construction of the electrical connection between the terminals 29 and 30 and the transformer 35 is provided due to the fact that the transformer and the casting forming the air passage 8 are preferably hinged to the duct 1 and the blower 7 in order that access may be readily gained to the interior of the burner.

By way of aiding the ignition of the combustible mixture and in controlling the direction of the arc between the terminals 29 and 30, I have provided the upper, transversely extending edge of the element 2 with an electrical conducting element indicated at 40 in Fig. 10. This element may be of nichrome wire or any suitable heat resisting, electrical conducting material and, in the embodiment illustrated, the wire is merely secured in the element 2 by stitching. The arrangement of the conducting element in this manner wherein it extends between and is spaced a short distance from the terminals 29 and 30 directs the passage of the arc through the air gap.

The air duct 1 may be provided at each end with baffle-like elements 201 and 202 which serve accurately to define and direct the air flow through the duct. Furthermore, the blower duct is preferably provided with a baffle indicated in dotted lines at 203 provided with a lever 204 for regulating the initial quantity of air supplied to the burner.

What I claim is:

1. A low-volatile liquid fuel burner of the character described comprising a screen-like fuel support and distributor upon which the fuel is burned and which said support is provided with a multiplicity of closely spaced openings therein, and incombustible fuel-absorbent material disposed about and between said openings whereby fuel supplied to said support in a zone of limited area will be distributed thereover in substantially all directions by capillary attraction; said openings being sufficiently large to permit a flow of air therethrough but of a smallness to enable said element when inclined at a substantial angle to the horizontal to support a gravitational flow thereupon of liquid fuel supplied to the top thereof within certain limits of fuel supply without loss of fuel by dripping, and said openings being constructed and arranged in such closely spaced relation as to provide a combustion-supporting association of air and fuel substantially throughout all portions of the upper surface of said element whereby combustion of said fuel will take place from the surface of said element and formation of carbonaceous deposits thereon is prevented.

2. A low-volatile liquid fuel burner of the character described comprising a fuel support and distributor upon which the fuel is burned; said support comprising a screen-like element provided with a multiplicity of closely spaced openings therein, and incombustible fuel-absorbent material disposed about and between said openings whereby fuel supplied to said support in a zone of limited area will be distributed thereover in substantially all directions by capillary attraction; said openings being sufficiently large to permit a flow of air therethrough but of a smallness to enable said element when inclined at a substantial angle to the horizontal to support a gravitational flow thereupon of liquid fuel supplied to the top thereof within certain limits of fuel supply without loss of fuel by dripping, and said openings being constructed and arranged in such closely spaced relation as to provide a combustion-supporting association of air and fuel substantially throughout all portions of the upper surface of said element whereby combustion of said fuel will take place from the surface of said element and formation of carbonaceous deposits thereon is prevented, and means for reinforcing said material to prevent substantial sagging thereof.

3. A low-volatile liquid fuel burner of the character described comprising a fuel support and distributor upon which the fuel is burned; said support being formed of strands comprising incombustible, fuel-absorbent material, said strands being interwoven to form a screen-like element having a multiplicity of closely spaced openings therein; said incombustible, fuel-absorbent material being disposed about and between said openings whereby fuel supplied to said support in a zone of limited area will be distributed thereover in substantially all directions by capillary attraction; said openings being sufficiently large to permit a flow of air therethrough but of a smallness to enable said element when inclined at a substantial angle to the horizontal to support a gravitational flow thereupon of liquid fuel supplied to the top thereof within certain limits of fuel supply without loss of fuel by dripping, and said openings being constructed and arranged in such closely spaced relation as to provide a combustion-supporting association of air and fuel substantially throughout all portions of the upper surface of said element whereby combustion of said fuel will take place from the surface of said element and formation of carbonaceous deposits thereon is prevented.

4. A low-volatile liquid fuel burner of the character described comprising a fuel support and distributor upon which the fuel is burned; said support including a screen-like element formed of strands of wire-like members substantially surrounded with incombustible fuel-absorbent material, said strands being interwoven to provide said element with a multiplicity of closely spaced openings therein, said incombustible, fuel-absorbent material being disposed about and between said openings whereby fuel supplied to said support in a zone of limited area will be distributed thereover in substantially all directions by capillary attraction; said openings being sufficiently large to permit a flow of air therethrough but of a smallness to enable said element when inclined at a substantial angle to the horizontal to support a gravitational flow thereupon of liquid fuel supplied to the top thereof within certain limits of fuel supply without loss of fuel by dripping, and said openings being constructed and arranged in such closely spaced relation as to provide a combustion-supporting association of air and fuel substantially throughout all portions of the upper surface of said element whereby combustion of said fuel will take place from the surface of said element and formation of carbonaceous deposits thereon is prevented.

5. A low-volatile liquid fuel burner of the character described comprising a screen-like fuel support and distributor upon which the fuel is burned and which said support is provided with a multiplicity of closely spaced openings therein, and incombustible fuel-absorbent material disposed about and between said openings whereby fuel supplied to said support in a zone of limited area will be distributed thereover in substantially all directions by capillary attraction; said openings being sufficiently large to permit a flow of air therethrough but of a smallness to enable said element when inclined at a substantial angle to the horizontal to support a gravitational flow thereupon of liquid fuel supplied to the top thereof within certain limits of fuel supply without loss of fuel by dripping, and said openings being constructed and arranged in such closely spaced relation as to provide a combustion-supporting association of air and fuel substantially throughout all portions of the upper surface of said element whereby combustion of said fuel will take place from the surface of said element and formation of carbonaceous deposits thereon is prevented; and said support having a plurality of transversely spaced, comparatively shallow depressions formed therein and extending generally longitudinally thereof whereby fuel supplied to the top of said support and in the zones of said depressions will be directed in its flow along said support.

WILLIAM C. MASON.